United States Patent [19]

Aoki et al.

[11] Patent Number: 4,494,845

[45] Date of Patent: Jan. 22, 1985

[54] SYSTEM FOR CONTROLLING THE ACTIVITY OF DEVELOPING SOLUTIONS AND APPARATUS FOR PROCESSING PHOTOSENSITIVE MATERIALS

[75] Inventors: Haruo Aoki, Kanagawa; Masahiro Terahata, Tokyo, both of Japan

[73] Assignee: Fuji Photo Film Co., Ltd., Kanagawa, Japan

[21] Appl. No.: 500,596

[22] Filed: Jun. 2, 1983

[30] Foreign Application Priority Data

Jun. 2, 1982 [JP] Japan .................................. 57-94271
Jun. 2, 1982 [JP] Japan .................................. 57-94272

[51] Int. Cl.$^3$ ........................ G03D 3/06; G06F 15/46

[52] U.S. Cl. .................................... 354/297; 364/502; 137/93

[58] Field of Search ....................... 354/297, 298, 324; 137/93; 364/502; 250/559; 356/443, 444; 400/30, 413

[56] References Cited

U.S. PATENT DOCUMENTS 4,293,211 10/1981 Kaufmann ........................... 354/298
4,422,152 12/1983 Kaufmann ...................... 354/298 X

*Primary Examiner*—William B. Perkey
*Attorney, Agent, or Firm*—Sughrue, Mion, Zinn, Macpeak and Seas

[57] ABSTRACT

A developer's activity control system and a photographic processing apparatus controlling same that divides the activity of the developing solution into a plurality of stages on the basis of the results of the processing of control strips and takes the necessary action for each stage, said developer control system includes a means for storing the initial conditions of the developing system and a means for comparing these initial conditions with the present conditions, the output of said comparing means being used to properly select the necessary action for each stage.

6 Claims, 5 Drawing Figures

| TROUBLES | CAUSES | REMEDIES |
|---|---|---|
| HIGH SENSITIVITY | TOO MUCH R A B | DEVELOP FULLY EXPOSED FILMS WITH UNREPLENISHED DEVELOPER |
| LOW SENSITIVITY | TOO LITTLE R A B | SUPPLY ADDITIONAL R A B |
| LONG HALFTONE GRADATION | TOO MUCH R A C | STOP THE SUPPLY OF R A C |
| SHORT HALFTONE GRADATION | TOO LITTLE R A C | SUPPLY ADDITIONL R A C |

SYSTEM FOR CONTROLLING THE ACTIVITY OF DEVELOPING SOLUTIONS AND APPARATUS FOR PROCESSING PHOTOSENSITIVE MATERIALS

FIELD OF THE INVENTION

The present invention relates to a system for controlling the activity of a developing solution for use in the processing of photosensitive materials and a photographic processing apparatus which includes such a control system. More particularly, the invention relates to a system that is fully automated to control the activity of a developing solution and a photographic processing apparatus which includes this control system and which maintains the photographic characteristics of finished prints at a high level.

BACKGROUND OF THE INVENTION

The processing of photographic materials such as films and printing papers (hereinafter referred to as films) in a photographic processor generally consists of development, fixation, washing and drying steps. The films that are fed into the processor are successively subjected to these steps.

The developing solution and fixing solution consumed in the development and fixation steps of the film processing, respectively, must be compensated by the necessary amount (this compensation is hereinafter referred to as the "replenishment" of the developing or fixing solution). Even if no film is processed, the activity of a certain developing solution, for example, a lith developer, is greatly reduced during storage and so must be replenished by an additional supply of a developing solution.

The first type of replenishment described above is usually referred to as replenishment after fatigue from processing (or simply "processing-exhaustion replenishment"). The second type of replenishment described above is referred to as replenishment time lapse exhaustion fatigue (or simply "time lapse exhaustion replenishment").

If the processing-exhaustion or time lapse exhaustion replenishment is excessive, either the exposed film is developed with the unreplenished developer or another corrective action, such as changing the replenishing ratio or stopping the time lapse exhaustion replenishment, must be taken. The above-described two types of replenishment and associated actions are effected in a processing solution activity control system. The present invention is directed to an improvement on this system, as well as a photographic processing apparatus that includes this system.

The system for controlling the activity of processing solutions is hereinafter described with particular reference to a lith developer. A schedule for the conventional method of replenishing a lith developer is shown in FIG. 1. In this method, two development replenishers (hereinafter referred to as replenishers), one for processing-exhaustion replenishment (hereinafter "RAB") and the other for time lapse exhaustion replenishment (hereinafter "RAC"), are supplied independently in such a manner that RAB is fed according to the amount of black area of the film being processed whereas RAC is first fed at the start of the processor's operation in an amount proportional to the number of hours spent before restarting the processor after its shutdown on the previous day, with a given amount of RAC supplied for every 1 or 2 hours of operation. In FIG. 1, A represents supplying RAB according to the amount of black area of the film being processed, $B_1$ and $B_2$ denote supplying RAC according to the number of hours spent before restarting the processor after its shutdown on the previous day ($B_1$: 14 hr, $B_2$: 15 hr), and C indicates supplying a given amount of RAC every 2 hours of the processor's operation. The formulation of RAB is primarily intended for correcting the sensitivity of the developer and RAC is so formulated as to correct the half-tone gradation.

However, in the method of FIG. 1, the activity of the developing solution varies with the processing conditions and other variables. This often results in inconsistent quality of the finished prints. To avoid this problem, the operator occasionally processes control strips and compares their densities with the reference conditions (the data for the fresh solution) to take any necessary action. The necessary actions are keyed to the specific troubles as shown in FIG. 2.

More specifically, the density on a predetermined position of a control strip is divided into four zones A, B, C and D according to how much it differs from the reference value (see FIG. 3), and the necessary action is taken for each zone.

(1) A-1 and A-2 zones: The activity of the developing solution is properly controlled and needs no adjustment.

(2) B-1 and B-2 zones: The developing solution is usable but its activity is not properly controlled and needs a remedial action for changing the replenishment ratio. Reduce the ratio if the zone is B-1 and increase it if the zone is B-2.

(3) C-1 and C-2 zones: The developing solution is unusable but its activity is still restorable by both temporary and sustained remedies.

C-1 zone: As the temporary remedy, develop a given volume of exposed film with unreplenished RAB for correcting the sensitivity. For correction of the half-tone gradation, stop the RAC replenishment. As the sustained remedy, decrease the replenishment ratio.

C-2 zone: As the temporary remedy, additionally supply RAB for correcting the sensitivity, and supply additional RAC for correcting the half-tone gradation. As the sustained remedy, increase the replenishment ratio for RAB and RAC.

(4) D-1 and D-2 zones: The developing solution is unusable and its activity is no longer restorable. Check the solution and the processor.

The operation manual available with each processor lists the specific number of exposed films to be developed with unreplenished developer, the amount of each replenisher to be supplied additionally and the degree of changing the replenishment ratio on the basis of a model processing by a model user. However, in actual cases, the processing conditions vary and a skilled operator must determine the specific value for each operation by experimentation. As shown in FIG. 3, the state of the developing solution is divided into four stages depending upon how much the density of the reference control strip differs from the fresh state, but the reliability of this strip has not been fully confirmed. Furthermore, the non-linearity of film processing makes the correcting conditions non-linear and no necessary adjustment to remove this non-linearity has been considered in the conventional system.

SUMMARY OF THE INVENTION

Therefore, one object of the present invention is to provide a fully automated developer's activity control system that checks the reliability of available data and determines the necessary correcting conditions and the specific value for each operation on the basis of arithmetic operational formulae.

Another object of the present invention is to provide a photographic processing apparatus which includes the above-described control system.

These objects can be achieved by a developer's activity control system (or a photographic processing apparatus) having a developer control means that divides the activity of the developing solution into a predetermined number of stages on the basis of the result of the processing of control strips and takes the necessary action for each stage, said developer control means includes a means for storing the initial conditions of the developing system and a means for comparing these initial conditions with the present conditions, the output of said comparing means being used to properly select the necessary action for each stage.

DESCRIPTION OF THE INVENTION

Figures 1, 2:
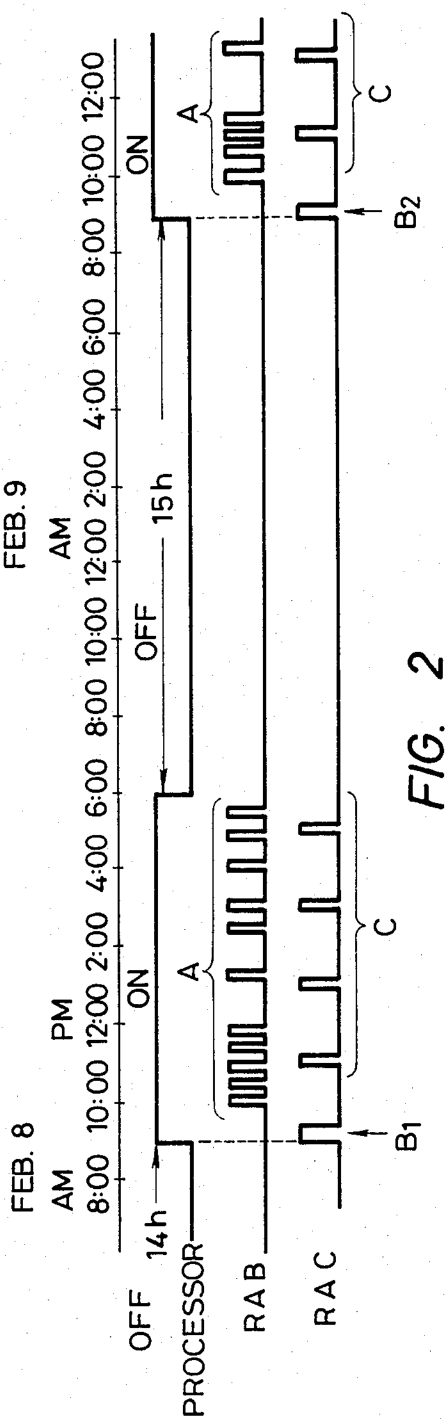
FIG. 1 is a schedule for the conventional method of replenishing a lith developer.
FIG. 2 is a troubleshooting table for use in the replenishment of a lith developer.
Figure 3:
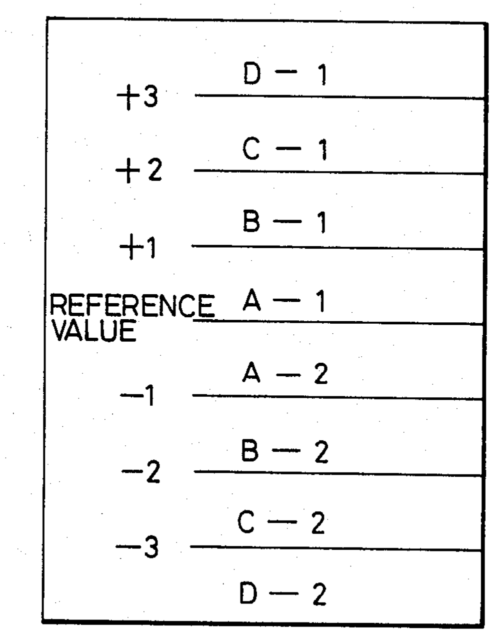
FIG. 3 shows the criteria for classifying the activity of the developing solution into four stages according to the results of processing the control strips.

One preferred embodiment of the present invention will now be described with reference to FIGS. 4 and 5.

(a) General Conditions (1) Conventional control strips are used in the present invention. They have a scale for sensitivity measurement (hereinafter scale A) and a scale for measuring the half-tone gradation (hereinafter scale B). The control strips are processed twice a day, in the morning and evening.

(2) The reference values for the control of control strips are based on the data of the two scales (A and B) for the fresh developing solution. In the illustrated embodiment, the control range on scale A is within ±0.03 in terms of density, and the control range on scale B is within ±2 in terms of the number of steps between two specific densities.

(3) The replenishment ratio of RAB depends on the result of daily processing, but no change is made to that ratio if a predetermined number of films have not been processed.

(4) The accuracy of the measurement of data on the control strips is determined by a comparison with the data of the last processing.

(b) Data to Be Stored

The following data should be stored in order to process films with the system of the present invention.

(1) The reference values for controlling the measurement data with the control strips (hereinafter simply referred to as the reference values). The reference value for scale A is denoted by $a_o$ and that for scale B by $b_o$.

(2) The last measurement data with the control strips (hereinafter referred to as the previous data). The previous data for scale A is denoted by $a_u$, and that for scale B by $b_u$.

(3) The latest measurement data with control strips after changing either RAC or RAB replenishment ratios (the data is hereinafter referred to as the recorded data). The recorded data for scale A is denoted by $a_x$ and that for scale B by $b_x$, x being an integer.

(4) The current RAB replenishment ratio, which is denoted by $T_{RB}$.

(5) The current RAC replenishment ratio when the processor is operating (this is denoted by $T_{RCP}$), and the current RAC replenishment ratio when the processor is shut down (this is denoted by $T_{RCr}$).

(6) The time that has elapsed since the last change in the RAC replenishment ratio. This is denoted by $T_x$.

(7) The daily throughout of films. This is denoted by A.

(c) Calculation of the Amounts of Be Corrected

The respective items of stored data and experimentally determined constants $K_1$ to $K_9$ are used to determine the necessary amounts of correction from the following formulae.

(1) For increasing the sensitivity by a temporary correction (correction as a temporary action), the additional supply of RAB ($V_1$) is calculated by:

$$V_1 = K_1 \times (a_1 - a_o) \quad (1)$$

wherein $K_1$ is the amount of replenisher necessary to increase the density by 0.01 on scale A.

(2) For decreasing the sensitivity by a temporary correction, the number of exposed films ($V_2$) to be developed with unreplenished developer is calculated by:

$$V_2 = K_1 \times (a_1 - a_o)/T_{RB} \quad (2)$$

(3) For changing the RAB replenishment ratio, the replenishment ratio after the change ($T'_{RB}$) is calculated by:

$$T'_{RB} = T_{RB} \times \left[ 1 - K_1 \times \frac{(a_1 - a_u)}{A \times T_{RB}} \right] \quad (3)$$

(4) For making the necessary correction on scale B due to changes in sensitivity, the following equation is used:

$$b'_1 = b_1 + K_2 \times (a_1 - a_o) \quad (4)$$

wherein $b_1$ is the value on scale B before correction, and $b'_1$ is the value after correction.

(5) For increasing the half-tone gradation by a temporary correction, the additional supply of RAC ($V_3$) is calculated by:

$$V_3 = (K_3 \times b'_1 - K_4) \times e \quad (5)$$

wherein $e = b'_1 - b_o$.

(6) For decreasing the half-tone gradation by a temporary correction, the period during which the supply of RAC is suspended is calculated by:

$$V_4 = (K_5 \times b'_1 - K_6) \times e \qquad (6)$$

(7) For changing the RAC replenishment ratio, the following equations are used:

$$T'_{RCP} = K_7 T_{RCP} \qquad (7)$$

$$T'_{RCr} = K_8 T_{RCr} \qquad (8)$$

wherein $T'_{RCP}$ and $T'_{RCr}$ are the values of $T_{RCP}$ and $T_{RCr}$ after correction, respectively.

Figure 4:
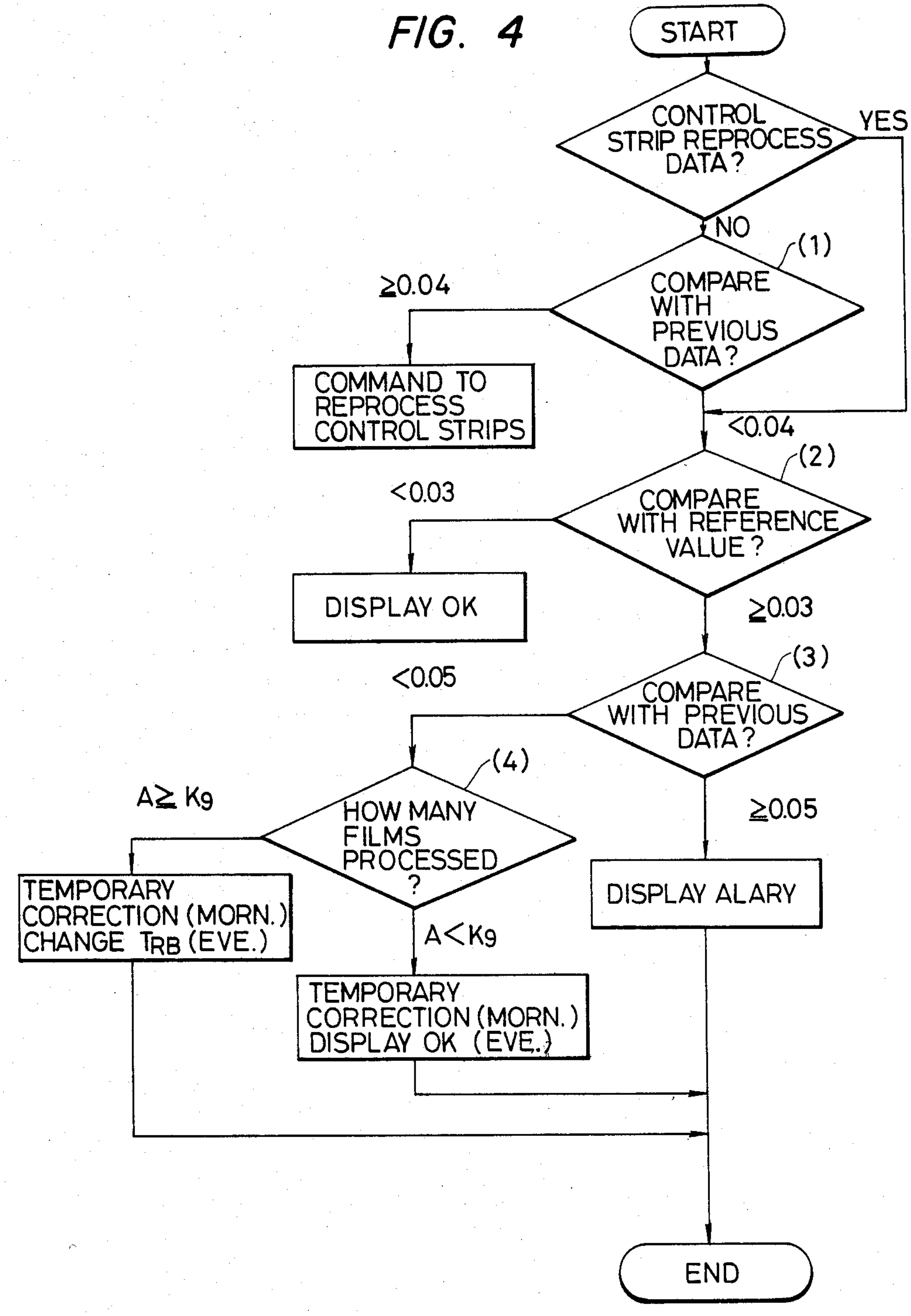
FIGS. 4 and 5 are flowcharts of computer programs which run on a microcomputer incorporated into the developer's activity control system according to one embodiment of the present invention.
Figure 5:
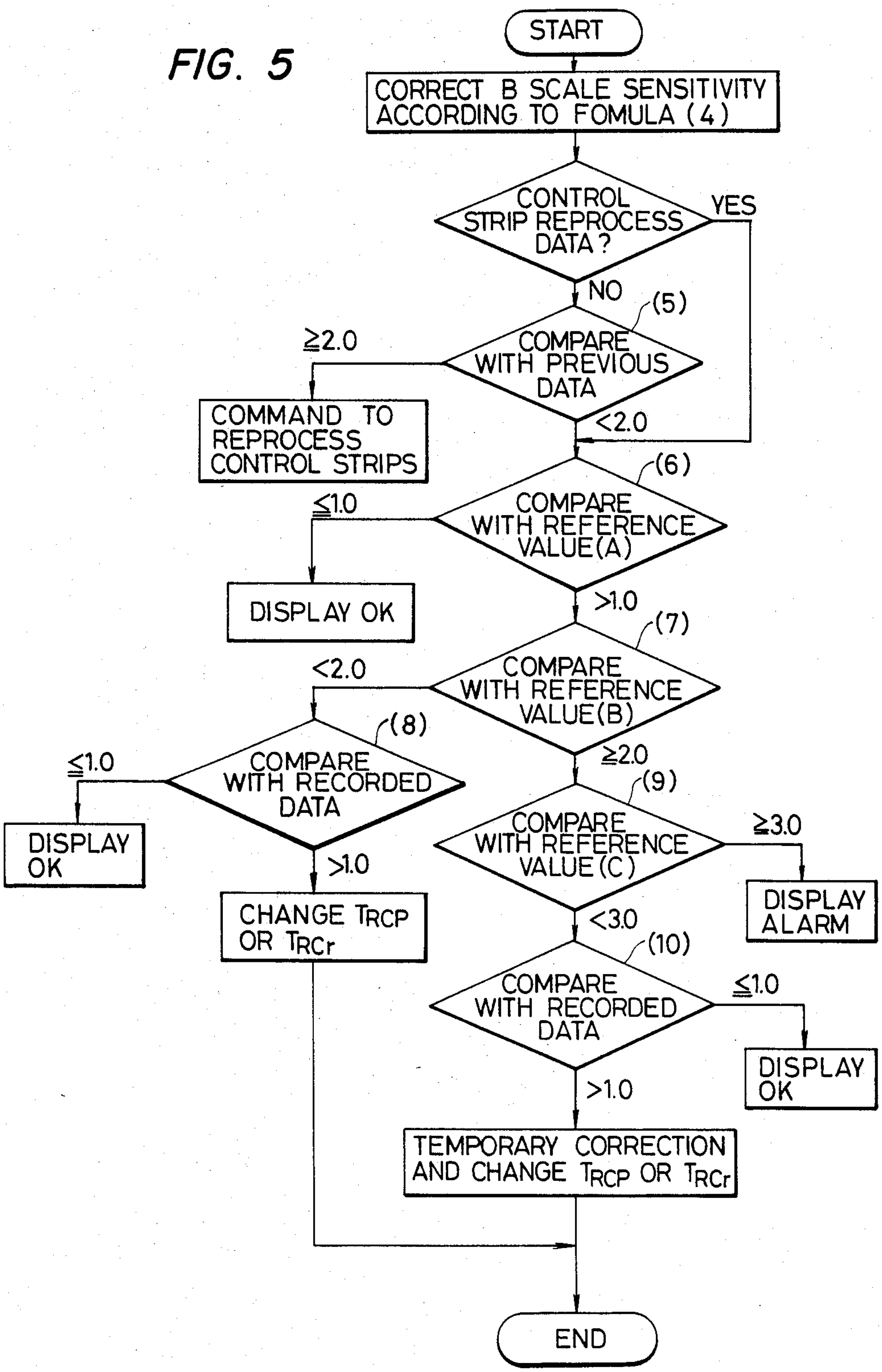

FIG. 4 is the flowchart of the operations of a microcomputer to correct changes in the sensitivity (scale A), and FIG. 5 is the flowchart for correcting changes in the half-tone gradation (scale B). The operation for correcting changes in the sensitivity is hereinafter described by reference to FIG. 4. It should be understood that the figures appearing in the following description are merely illustrative and will be modified according to the specific type of the film, processing solution and control strip.

(i) First, make a comparison with the last measurement data with the control strips. If the difference is 0.04 or more, a command for reprocessing the control strips is issued. If the difference is less than 0.04, go to the next step (see step 1 in FIG. 4).

(ii) Compare with the reference value. If the difference is less than 0.03, no action is needed and "OK" is displayed. If the difference is 0.03 or more, go to the next step (see step 2).

(iii) Compare with the previous data. If the difference is 0.05 or more, "ALARM" is displayed. If the difference is less than 0.05, make a temporary correction according to formula (1) or (2) (if the control strips were processed in the morning or on the opening hour), or change the RAB replenishment ratio according to formula (3) (if the strips were processed in the evening or on the closing hour). The RAB replenishment ratio need not be changed if the number of films processed (A) has not reached a predetermined number ($K_9$) (see steps 3 and 4).

The operation for correcting changes in the half-tone gradation is hereinafter described by reference to FIG. 5.

(i) Use formula (4) to make the necessary correction on scale B following changes in the sensitivity. Based on the corrected B scale, perform the following operations.

(ii) Compare the corrected value with the previous data. If the difference is 2.0 or more, a command for reprocessing the control strips is issued. If the difference is less than 2.0, go to the next step (see step 5 in FIG. 5).

(iii) Make a comparison (A) with the reference value. If the difference is 1.0 or less, no action is necessary and "OK" is displayed. If the difference is greater than 1.0, go to the next step (see step 6).

(iv) Make a comparison (B) with the reference value. If the difference is less than 2.0, go to step 8, and if the difference is 2.0 or more, go to step 9 (see step 7).

(v) Compare with the recorded data. If the difference is 1.0 or less, no action is necessary and "OK" is displayed. If the difference is greater than 1.0, change the RAC replenishment ratio according to formulae (7) or (8) (see step 8).

(vi) If the difference from the reference value is 2.0 or more, make a comparison (C) with the reference value. If the difference is 3.0 or more, "ALARM" is displayed. If the difference is less than 3.0, compare with the recorded data. If the difference is 1.0 or less, no action is necessary and "OK" is displayed. If the difference exceeds 1.0, make a temporary correction according to formula (5) or (6), and at the same time, change the RAC replenishment ratio according to formulae (7) and (8) (see steps 9 and 10).

As already mentioned, coefficients $K_1$ to $K_8$ included in formulae (1) to (8) and the reference number of the films to be processed ($K_9$) are determined experimentally and they vary with the type of the film, developer or processor, so different values must be used for different combinations of these parameters. In the illustrated embodiment, the same coefficients were used for changing the RAB and RAC replenishment ratios whether the change is on the positive side (the ratio is increased) or on the negative side (the ratio is decreased), but needless to say, an optimum value for each side may be selected to control the activity of the developing solution more precisely. A finer control is also possible by branching step (2) onward in FIG. 4 and performing optimum processing according to whether the control strips were processed in the morning or evening. These and other modifications can be made to the illustrated embodiment without departing from the spirit of the present invention.

As described in the foregoing pages, the present invention contemplates a developer's activity control system that divides the activity of the developing solution into a plurality of stages on the basis of the result of the processing of control strips and takes the necessary action for each stage. The system includes a means for storing the initial conditions of the developing system and a means for comparing these initial conditions with the present conditions. The output of said comparing means is used to determine the proper action for each stage by arithmetic operations. Having this configuration, the system provides a fully automated control of the activity of the developing solution in a photographic processor. This system may be built into the photographic processor. In a more efficient way, terminals installed on a plurality of processing sites may be connected on-line to the central processing unit to establish a timeshaped system, or a single terminal way be so designed to control more than one photographic processor.

We claim:

1. A method for controlling the activity of developing solution, comprising the steps of:

electronically storing data collected through the use of control strips, said control strips providing reference data on first and second testing scales, said testing scales being correlative to different photographic sensitivities;

electronically comparing the most recently collected first testing scale data with first testing scale data stored previously to correct the developing solution condition for which said testing scale is correlative;

electronically revising said second testing scale data to comport with the correction to the developing solution brought about by the previous step; and electronically comparing the most recently collected and revised second testing scale data with second testing scale data stored previously to correct the developing solution condition for which said second testing scale is correlative.

2. An apparatus for controlling the activity of developing solution, comprising: first control system responsive to a first-type of photographic sensitivity and a second control system responsive to a second-type of photographic sensitivity, said first control system comprising electronic means for comparing current first-type sensitivity conditions to prior recorded first-type sensitivity conditions to determine a first corrective action for said developing solution, said second control system comprising electronic means for adjusting its calculations in response to said corrective action of said first control system and further comprising electronic means for comparing current adjusted second-type sensitivity conditions to prior recorded second-type sensitivity conditions to determine a second corrective action for said developing solution, said first and second correcting activity imparting correction to said developing solution either by way of immediate temporary correction or by way of longer-term changes to electronically stored system adaption ratios.

3. A method for controlling the activity of developing solution, as recited in claim 1, wherein said first testing scale data stored previously includes first testing scale reference data and the most recent previous first testing scale data.

4. A method for controlling the activity of developing solution as recited in claim 1, wherein said second testing scale data stored previously includes the most recent previous second testing scale data, second testing scale reference data and the second testing scale data most recently collected immediately before revision.

5. Apparatus for controlling the activity of developing solution, as recited in claim 2, wherein said previously recorded first-type sensitivity conditions include first testing scale reference conditions and the most recent previously recorded first testing scale conditions.

6. Apparatus for controlling the activity of developing solution, as recited in claim 2, wherein said previously recorded second-type sensitivity conditions stored previously includes the most recent previous second testing scale conditions, second testing scale reference conditions and second testing scale conditions collected immediately before adjustment.

* * * * *